United States Patent [19]

Shapiro et al.

[11] Patent Number: 4,544,285
[45] Date of Patent: Oct. 1, 1985

[54] FLUID EQUALIZED TILTING PAD THRUST BEARINGS

[75] Inventors: Wilbur Shapiro, Schenectady, N.Y.; Richard W. Graham, II, Clarksburg; Hugh G. Anderson, Jr., Severna Park, both of Md.

[73] Assignee: The United States of America as represented by the Secretary of the Navy, Washington, D.C.

[21] Appl. No.: 486,170

[22] Filed: Apr. 18, 1983

[51] Int. Cl.[4] .................... F16C 39/04; F16C 17/06
[52] U.S. Cl. ....................................... 384/99; 384/306
[58] Field of Search ............... 384/99, 122, 111, 420, 384/306, 313

[56] References Cited

U.S. PATENT DOCUMENTS

| | | | |
|---|---|---|---|
| 3,782,793 | 1/1974 | Sinner | 384/99 |
| 3,799,628 | 3/1974 | Van Gaasbeek et al. | 384/99 |
| 4,073,549 | 2/1978 | Christ et al. | 384/122 |

Primary Examiner—Lenard A. Footland
Attorney, Agent, or Firm—Robert F. Beers; Luther A. Marsh; Roger L. Maxwell

[57] ABSTRACT

A thrust bearing for a main propulsion shafting system on a ship having tilting pads and fluid equalizing pistons. Hydraulic oil fills a recess on the face of each pad to provide additional lubrication and hydrostatic pressure to allow the bearing to handle added load capacity. The system for supplying oil to the recess may either be separate from the piston equalizing hydraulic system or part of a combined system. In the combined system, stationary control pads sense the oil thickness and control the oil flow.

4 Claims, 6 Drawing Figures

FLUID EQUALIZED TILTING PAD THRUST BEARINGS

BACKGROUND OF THE INVENTION

1. Field of the Invention

This invention relates generally to a thrust bearing and more specifically to a thrust bearing having tilting pads supported by fluid equalized pistons.

2. Description of the Prior Art

While the construction of thrust bearings has become highly developed and very effective thrust bearings are now available for common use, bearings for high load situations are still somewhat imperfect. In shipboard main propulsion shaft systems, for example, conventional thrust bearings have not been satisfactory, due to several factors present in that environment. The loads on such shafts needed to drive the ship through the water are enormous, especially on larger ships, making the bearing load equally large. In addition, since the shaft must be sealed to prevent the introduction of seawater, very little tolerance is allowed for movement of the shaft. Misalignment and distortion of the shaft may also create problems, especially since the ship is operating in a rugged environment where heavy seas may inflict damage and maintenance facilities may not be available.

In order to combat these problems, specialized bearings have been designed for use in such environments. One such prior art device is shown in FIGS. 1 and 2. The thrust bearing, shown generally as 10 is formed in the shape of a ring having a central aperture 12 through which the shaft (not shown) passes. The shaft normally carries an integrally attached collar which contacts the thrust bearing. The ring is divided into a plurality of thrust pads (also known as thrust shoes) 14 separated by small spaces 16. The number of pads may vary, but there are commonly 8 or 10 in a ring. Each pad is supported from behind by a hydraulic piston 18 which is commonly connected to a pair of hydraulic oil manifolds 20. The manifolds 20 are connected to a common hydraulic line 22 which acts to supply additional oil to and receive excess oil from the manifolds 20. Position control valve 24 connects line 22 either to the oil supply or to the oil return depending on the needs of the manifold 20. Limit switches 26 are actuated by a dial indicator which senses the position of the piston 18. If the pistons 18 are either overextended or underextended, switches 26 close to supply power to solenoid 28 to control the valve 24 and the flow of oil. The manifold 20 may also be connected to accumulators so that the bearing manifold system acts to dampen out propeller vibrations.

FIG. 2 shows a cross-section of one of the pads. The pad 14 includes a Babbitt surface 30 and is carried on a pivot 32. The pivot 32 allows the pad 14 to move and produce a tapered wedge in the direction of shaft motion for fluid film hydrodynamic lubrication and also tilt in the radial direction to accommodate misalignment and distortions of the rotating thrust collar. The pivot 32 rests on piston 18 which slides in and out within a bushing 34 in response to thrust against the pad in front and hydraulic pressure from behind. Oil is supplied to cavity 35 from manifold 20 and pushes out against the piston 18. The bushing 34 is carried in a housing 36. When the thrust against one pad increases, the piston is forced back against the oil in the cavity increasing the pressure in the manifold. This causes an increase in pressure in the cavities of other pistons, thus forcing other pistons and pads outwardly to equalize the burden among the pads. Thus, unevenness in the shaft and its movement is handled by individual pads which can "wobble" on their pivots and by the equalizing effect of the manifold system. An indicator assembly 38 connected to one of the pistons indicates the movement of the piston in and out and controls the increase and decrease of oil in the system.

While this system has performed relatively well in ship shafting system environments, it is limited in the amount of thrust load it can handle, especially at low speeds. In addition, a certain amount of torque is required when starting the shaft to move.

SUMMARY OF THE INVENTION

The present invention overcomes these difficulties by forming a recess in the face of each pad and supplying hydraulic oil to the recess. The oil increases lubrication and also acts as a hydraulic ram to enable the bearing to handle increased loads. Normal hydrodynamic load capacity of this recessed-pads-thrust bearing is augmented by hydrostatic or externally pressurized lubrication through the recesses in the pads.

Accordingly, one object of the invention is to provide a new and improved thrust bearing.

Another object of the inention is to provide a thrust bearing capable of handling increased loads.

A further object of the invention is to provide a thrust bearing having recesses on thrust pads which are filled with hydraulic oil.

Another object of the invention is to provide a new and improved thrust bearing for a ship capable of handling increased loads and having hydraulic oil filled recesses on pivotable pads which are carried by hydraulically equalized pistons.

Other objects, advantages and novel features of the invention will become apparent from the following detailed description of the invention when considered in conjunction with the accompanying drawings wherein:

DETAILED DESCRIPTION OF THE DRAWINGS

Figure 1:
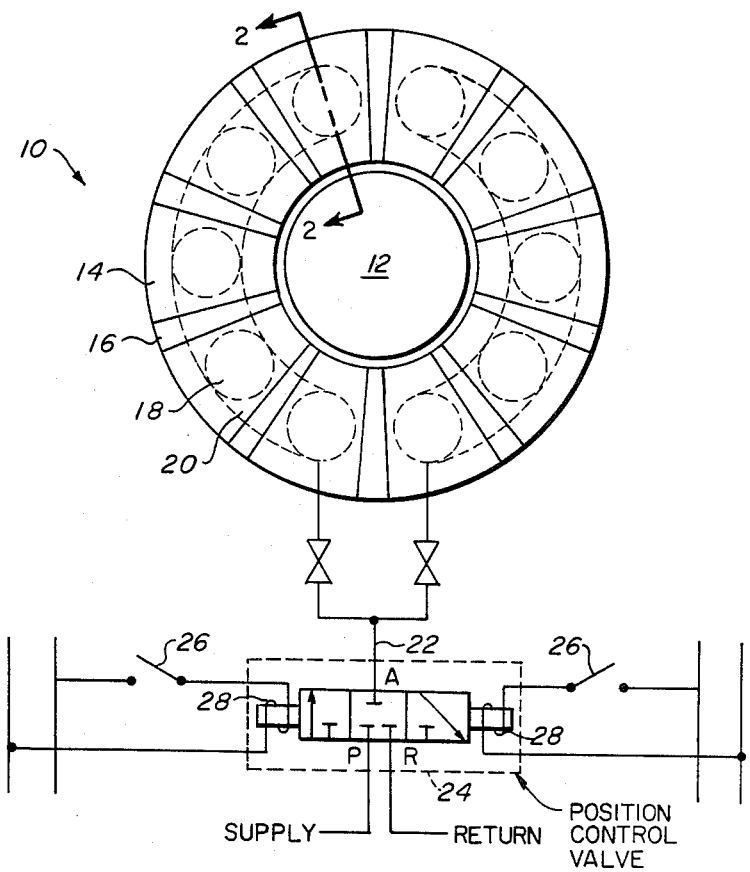
FIG. 1 is a schematic of a prior art device.
Figure 2:
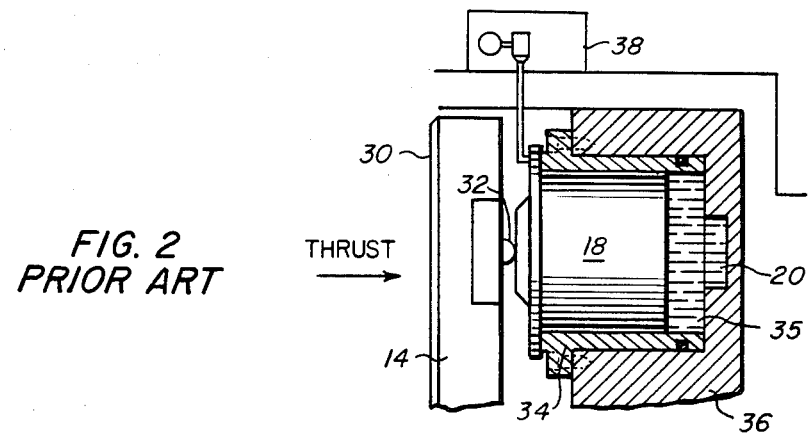
FIG. 2 is a cross-sectional view along line 2—2 of FIG. 1.
Figure 3:
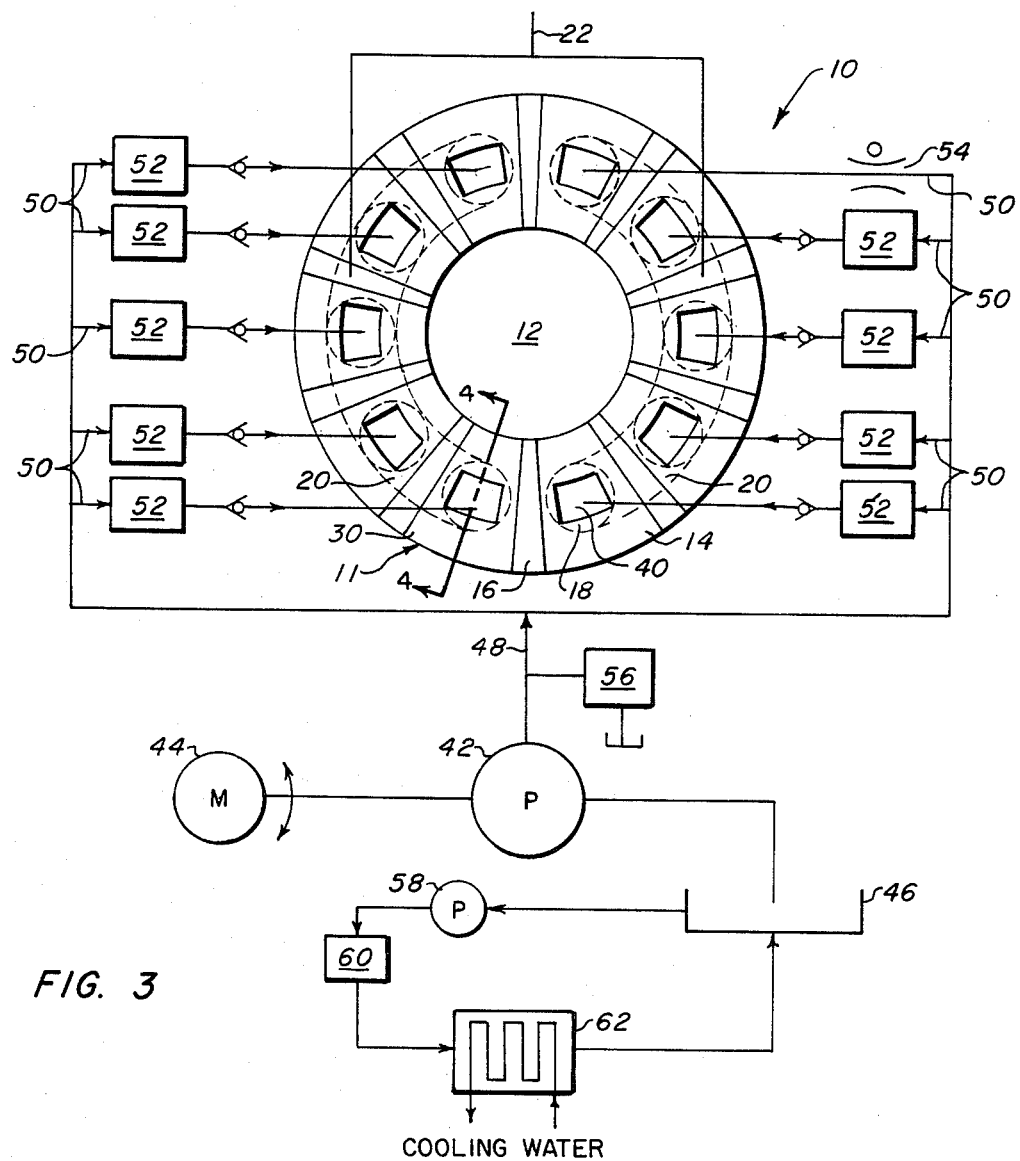
FIG. 3 is a schematic of a first embodiment of the present invention.

Referring now to FIG. 3 wherein a schematic of the present thrust bearing 10 is shown as a ring 11 surrounding a central aperture 12 for receiving a shaft (not shown). The ring 11 includes a plurality of thrust pads 14, each pad 14 having a face or thrust receiving surface 30 (as shown in FIG. 3 and more particularly in FIG. 4 a Babbitt surface), separated by spaces 16. Pistons 18 underlie the pads and are connected together by manifolds 20. Hydraulic line 22 supplies the manifolds 20 with additional oil which is controlled in a manner similar to the prior art device shown in FIG. 1.

Hydrostatic recesses 40 are provided in the face of thrust receiving surface 30 of each pad 14 and connected to a source of hydraulic oil. A constant displacement pump 42 is driven by motor 44 to pump hydraulic oil from sump 46 through feed line 48 into individual lines 50 for each of the pads 14. All but one of the lines 50 contains a flow control valve 52 to maintain a constant flow of oil therethrough. The last line contains an orifice 54. A relief valve 56 is connected to line 48 to relieve any overpressure in the lines 50 and return the oil to sump 46. The oil in the sump 46 is cooled and filtered by being pumped by a pump 58 through a filter 60, and a heat exchanger 62 before being returned to the sump 46 again.

Figure 4:
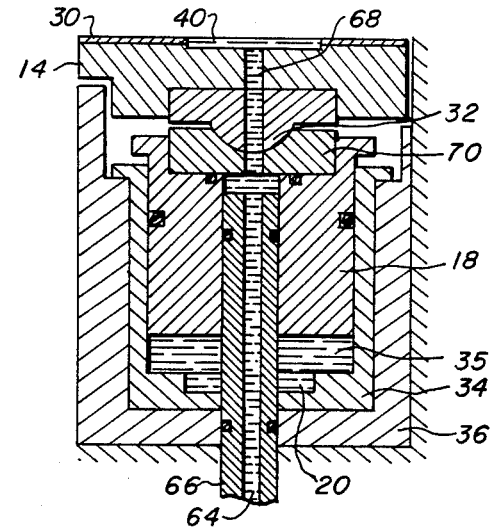
FIG. 4 is a cross-sectional view along line 4—4 of FIG. 3.

As shown in FIG. 4, after passing through individual lines 50, the oil passes through a channel 64 in the center of a tube 66 which passes through the center of the piston 18. A second channel 68 is directly in line with channel 64 and passes through the center line of the thrust pad 14 and pivot 32. This channel 68 is in fluidic communication with the hydrostatic recess 40 on the face of the thrust pad 14. A seat 70 for the pivot 32 is carried by the piston 18 and receives the pivot 32 in a depression having the same shape. This arrangement limits the amount of "wobble" movement of the pad 14 and forces the two channels to remain in communication. Introducing oil directly through the pad pivot 32 avoids upsetting moments that could decrease hydrodynamic, hydrostatic load capability.

In operation, the constant displacement pump 42 provides hydraulic oil to nine flow control valves 52 and orifice 54. The nine valves 52 allow a constant flow of oil to each channel 64. Since the pump 42 produces a constant flow and each valve 52 passes a constant flow, orifice 54 is also subject to a constant flow. Since the flow is also proportional to the square root of the pressure drop (P supply — P recess) across the orifice 54, the pressure drop must also be a constant. Since the load on the pads 14 is proportional to the pressure in the recess 40, the supply pressure will be proportional to the load. Thus, this arrangement limits the pump supply pressure only to a value necessary to accommodate the load, rather than requiring the pressure to be set at its highest anticipated level.

The flow from the valves 52 or orifice 54 goes into channel 64 and from there into a second channel 68 and recess 40. The oil filling the recess 40 helps to lubricate the surface of the pad 14 where it contacts the collar (not shown) of the shaft. In addition, and more importantly, the recess 40 holding the oil effectively acts as a hydraulic ram which pushes against the collar of the shaft thereby augmenting load capability. The result of this action is to allow the bearing 10 to accommodate a much larger total load than the prior art device. The oil from each pad 14 is collected in a conventional manner after lubricating the surface and returned to the sump 46. This circulation of oil plus the introduction of cool oil directly into the film keeps the bearing cool. The oil pressure from the oil in the recess 40 acting against the collar makes the shaft easy to start and run at low speed since it prevents contact between the collar and bearing 10.

Figure 5:
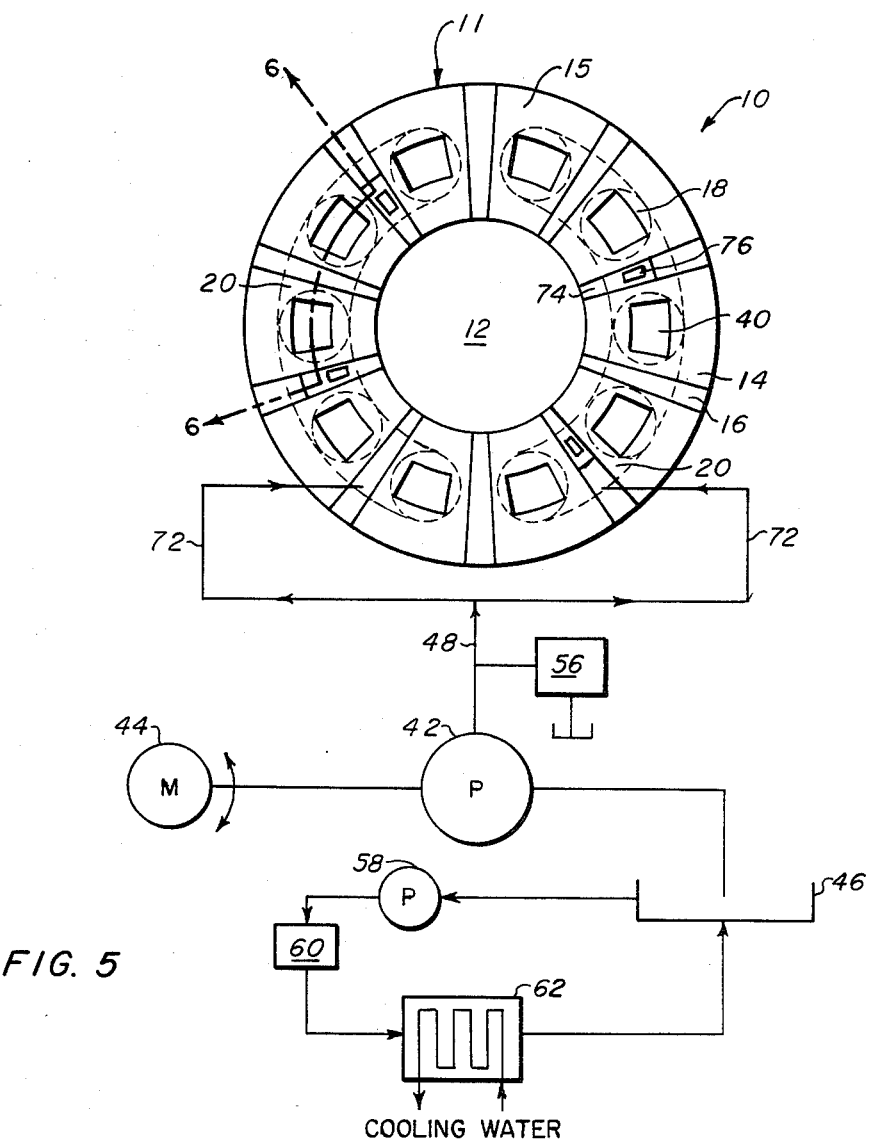
FIG. 5 is a schematic of a second embodiment of the present invention.
Figure 6:
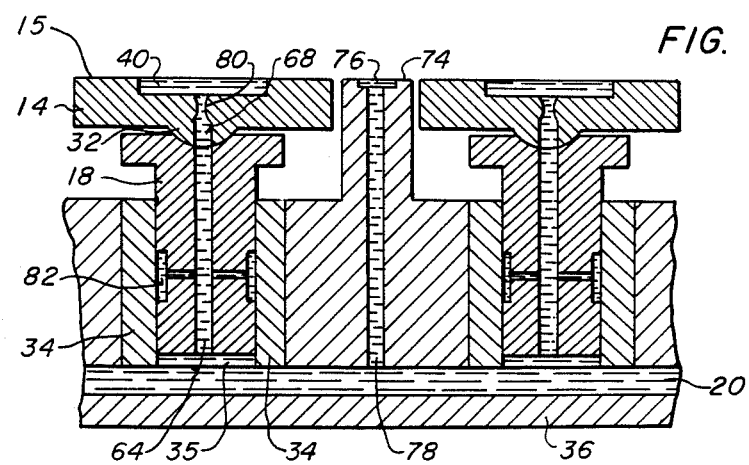
FIG. 6 is a cross-sectional view along line 6—6 of FIG. 5.

A second embodiment of the invention, shown in FIGS. 5 and 6, combines the two hydraulic systems into a single system. This bearing 10 includes pads 14 with recesses 40 in thrust receiving surfaces 15 thereof, carried on pistons 18 which are connected together with a manifold 20 in the same manner as the device shown in FIGS. 3 and 4. Likewise, a similar oil supply arrangement has been used; however, oil from the pump is carried by lines 48 and 72 to the mainfolds 20. The manifold 20 supplies oil to the pistons 18 and also to the recesses 40 of each pad 14 in a single channel rather than in separate channels. Also added to the thrust bearing 10 are a plurality of control pads 14 74 placed in the spaces 16 between thrust pads. Each control pad 74 is stationary and carries a recess 76 on the pad face.

As seen best in FIG. 6, the recess 76 in the control pad surface 74 is connected by channel 78 to manifold 20. At the same time each cylinder hydraulic piston 18 is supported by oil in cavity 35 which is also in communication with the manifold 20. Channel 64 is in communication with cavity 35 and carries oil therefrom to channel 68. Channel 68 contains an orifice restriction 80 which limits the flow therethrough to recess 40. Recesses 82 may also be formed in the side walls of the piston 18 and connected to channel 64.

In operation, a constant flow of oil is supplied to the bearing 10 which is distributed between the thrust pads 14 and control pads 74. If the distance between the control pad 74 and the shaft collar (not shown) decreases, the pressure in the recess 76 of the control pad 74 increases. Since the recess is directly connected to the oil supply in the manifold 20, the manifold oil pressure also rises, causing more force to be applied in cavity 35 to the bottom of piston 18. This force causes the piston 18 to push the thrust pad 14 toward the collar and better support it. Also the pressure in recess 40 increases and adds further load carrying capability to the pad 14. In other words, the control pad 74 senses the approach of the collar and increases the pressure on the thrust pads 14 in response thereto. This allows the bearing 10 to follow the distortion and misalignment of the shaft and apply even pressure at all points around the shaft collar.

Orifice restrictor 80 provides a certain stiffness to the fluid film during angular motions of the shaft collar. Recesses 82 are placed in the side walls of the piston 18 to make the sliding motion of the piston 18 against the bushing 34 easier by forcing the two walls slightly away from each other by hydrostatic pressure. These recesses 82 could also be provided in the embodiment of FIGS. 3 and 4 if desired.

By allowing the two hydraulic systems to be connected together, it is not necessary to have O-rings around the pistons 18 to prevent leakage. This makes the device simpler and less susceptible to piston 18 hangup.

The size of the recesses in both embodiments may be determined by the size of the load to be supported. The thickness of the oil film on the pad surface may be about 0.003 inches for a load of about 400,000 pounds. The flow to the thrust pad may be in the range of 1,000–2,000 cubic inches per second.

Obviously many modifications and variations of this invention are possible in light of the above teachings. It is therefore to be understood that within the scope of the appended claims, the invention may be practiced otherwise than as specifically described.

What is claimed is:

1. A thrust bearing in the shape of a ring having a central aperture, comprising:
    a plurality of thrust pads arranged around said ring, each of said thrust pads including a thrust receiving surface and having a recess in said thrust receiving surface;

hydraulic oil supplying means for providing hydraulic oil to said thrust bearing;

a first plurality of channels for carrying hydraulic oil, each of said channels being in fluidic communication with said hydraulic oil supplying means;

a second plurality of channels for carrying hydraulic oil, each of said channels being in fluidic communication with one of said recesses and passing through the corresponding thrust pad, each of said channels including an orifice restriction, said channels also being connected to said hydraulic oil supplying means via a corresponding channel of said first plurality of channels;

a plurality of pistons, each of said pistons supporting one of said thrust pads, each of said plurality of pistons having one of said first plurality of channels passing therethrough;

at least one manifold connected to said hydraulic oil supplying means;

a plurality of bushings for housing said plurality of pistons, each of said bushings in combination with one of said plurality of pistons defining a cavity, wherein said plurality of cavities are in fluidic communication with said at least one manifold for receiving hydraulic oil and applying force to said plurality of pistons, and further wherein said first plurality of channels are in fluidic communication with said plurality of cavities; and a second recess in a sidewall of each of said plurality of pistons for receiving hydraulic oil from said first plurality of channels.

2. A thurst bearing in the shape of a ring having a central aperture, comprising:

a plurality of thrust pads arranged around said ring, each of said thrust pads including a thrust receiving surface and having a recess in said thrust receiving surface;

hydraulic oil supplying means for providing hydraulic oil to said thrust bearing;

a first plurality of channels for carrying hydraulic oil, each of said channels being in fluidic communication with said hydraulic oil supplying means;

a second plurality of channels for carrying hydraulic oil, each of said channels being in fluidic communication with one of said recesses and passing throught the corresponding thrust pad, said channels also being connected to said hydraulic oil supplying means via a corresponding channel of said first plurality of channels; and at least one stationary control pad having a control recess for receiving hydraulic oil, said control recess being in fluidic communication with said at least one manifold.

3. A thrust bearing for a large load carrying shaft, comprising:

a housing in the shape of a ring, having a central aperture for receiving said large load carrying shaft;

a plurality of thrust pads arranged around one face of said ring, said plurality of thrust pads being in the shape of ring segments, each of said plurality of thrust pads having a thrust receiving surface and each said thrust receiving surface having a recess formed in a face thereof for receiving hydraulic oil;

a pivot mounted on a surface of each of said plurality of thrust pads opposite said thrust receiving surface;

a plurality of bushings mounted in said housing;

a plurality of pistons mounted in said plurality of bushings, each of said plurality of pistons supporting one of said pluralities of pivots and thrust pads, and further wherein each of said plurality of pistons in combination with one of said plurality of bushings defines a cavity, each of said cavities underlying one of said plurality of pistons for receiving hydraulic oil and applying an outwardly directed force to said piston;

at least one manifold for communicating hydraulic oil among said plurality of cavities;

a first plurality of channels for carrying hydraulic oil, each of said first plurality of channels passing through one of said plurality of pistons;

a second plurality of channels for carrying hydraulic oil to each of said recesses, each of said second plurality of channels in fdic communication with one of said first plurality of channels and passing through one of said plurality of thrust pads, each of said second plurality of channels including an orifice restriction; and at least one stationary control pad having a control recess for receiving hydraulic oil, said control recess being in fluidic communication with said at least one manifold.

4. The thrust bearing according to claim 3 further comprising:

an additional recess in each said plurality of pistons in fluidic communication with one of said first plurality of channels for receiving hydraulic oil therefrom.

* * * * *